United States Patent [19]

Frey

[11] Patent Number: 4,800,819

[45] Date of Patent: Jan. 31, 1989

[54] RAILWAY CAR

[75] Inventor: Ronald L. Frey, Bethlehem, Pa.

[73] Assignee: Bethlehem Steel Corp., Bethlehem, Pa.

[21] Appl. No.: 669,707

[22] Filed: Nov. 9, 1984

[51] Int. Cl.[4] ............................................. B60P 3/40
[52] U.S. Cl. ................................ 105/238.1; 105/355; 105/404; 410/44
[58] Field of Search ............... 105/413, 414, 404, 416, 105/419, 355, 460, 422, 1 R, 3, 238 R; 410/94, 44, 52

[56] References Cited

U.S. PATENT DOCUMENTS

| 727,488 | 5/1903 | Swanson | 105/414 |
| 1,021,124 | 3/1912 | Wolff | 105/416 |
| 2,427,279 | 9/1947 | Hedges | 410/39 |

FOREIGN PATENT DOCUMENTS 736718  6/1966  Canada ............................... 105/178

Primary Examiner—Johnny D. Cherry
Assistant Examiner—Dean J. Kramer

[57] ABSTRACT

A railway idler car used as a spacer car between loaded cars that carry very long objects, such as plates, girders, structural steel, pipe, poles and the like. The car is of a skeleton design and is incapable of carrying freight.

3 Claims, 2 Drawing Sheets

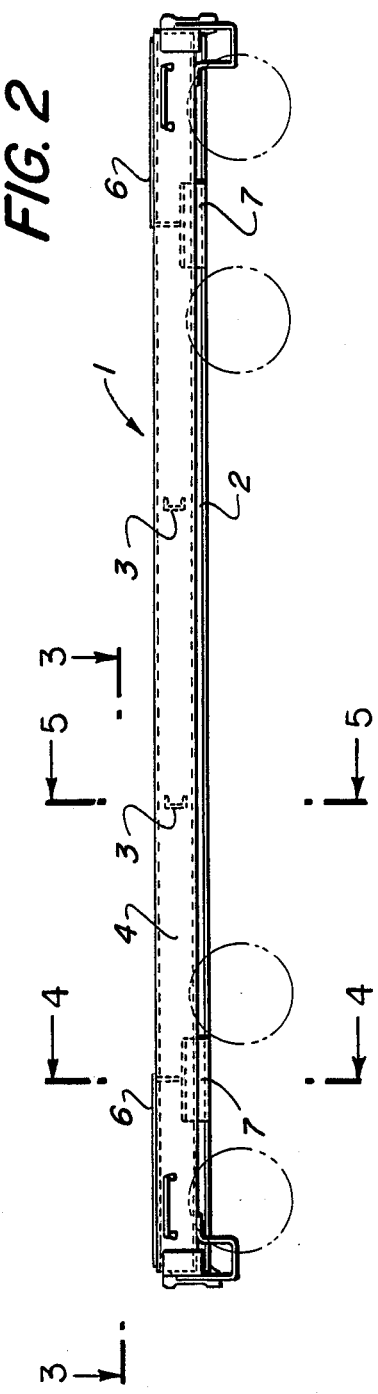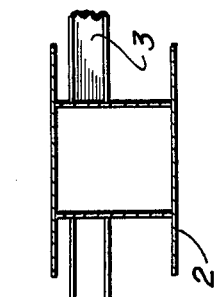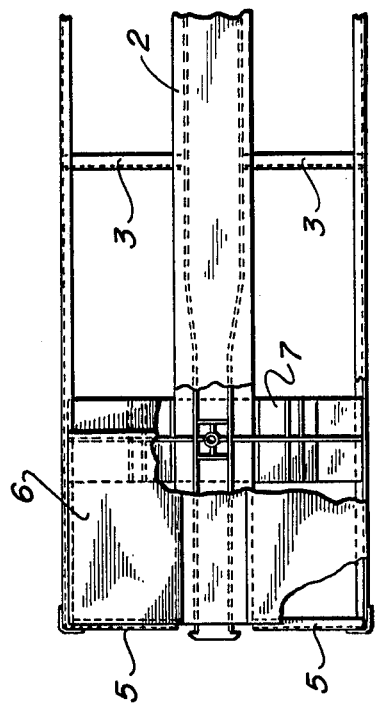

RAILWAY CAR

BACKGROUND OF THE INVENTION

This invention relates to a railway car. It relates particularly to a skeleton railway car used as an idler car to be positioned as a spacer car between conventional railway cars loaded with very long objects.

When long objects such as plates, girders, structural steel, pipe, poles, timbers and the like are shipped by rail and are longer than the length of the car, American Association of Railroads (A.A.R.) rules require a flat car be connected to the loaded car so that the flat car is spaced under, but not usually supporting, the projecting ends of the long objects.

Railway flat cars are built without sides or ends but have a very strong flat structural floor to permit the flat car to carry large, heavy or bulky objects, such as machinery, that cannot otherwise fit in a gondola or freight car. The use of a conventional flat car as an idler car or spacer between cars carrying very long objects is wasteful and expensive since it prevents the railroad from using the car for which it was designed, i.e. carrying large, heavy, bulky freight, and requires the shipper to pay high rates to use the flat car as a spacer car.

Skeleton cars, such as described in U.S. Pat. No. 3,577,933 to Ferris, have been designed in the past to carry special loads such as ocean freight containers in "land bridge" operations. However, such prior skeleton cars have required a complex, strong structural truss design in order to carry the vertical loads of the shipping containers placed on the cars.

SUMMARY OF THE INVENTION

It is an object of this invention to provide an idler railway car that is adapted to serve as a non-revenue carrying spacer car between conventional railway cars loaded with very long objects.

It is another object of this invention to provide an idler railway car that is lighter in weight and is easier and less expensive to construct and maintain than conventional flat cars.

It is a further object of this invention to provide an idler car which will permit the railroads to use their inventory of conventional flat cars primarily for the revenue producing carrying of large, heavy, bulky loads instead of being used as spacer cars.

It has been discovered that the foregoing objectives can be attained by a skeleton car having an open, lightweight frame, floorless and incapable of carrying vertical payloads and with sufficient strength only to carry train action loads and to support and operate conventional railway car equipment required by A.A.R. regulations, such as brakes, ladders, couplers and the like.

BRIEF DESCRIPTION OF THE DRAWINGS

FIG. 2 is a side elevation of a railway car of this invention.

FIG. 3 is a top plan view of one end of a railway car of this invention.

FIG. 5 is a section taken along line 5—5 of FIG. 2.

DESCRIPTION OF THE PREFERRED EMBODIMENT

Figure 1:
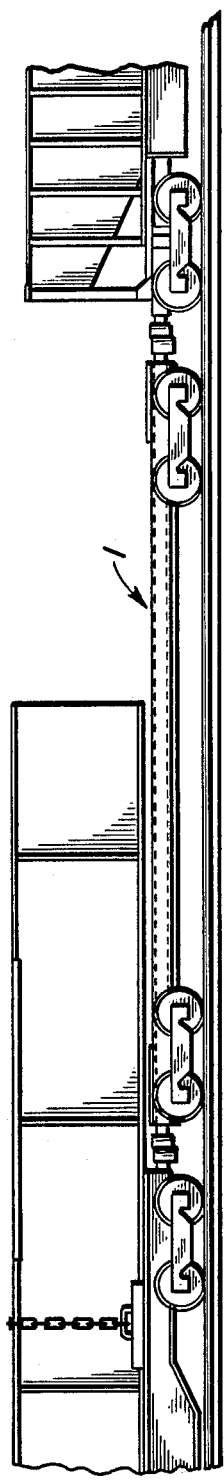
FIG. 1 is a side elevation of a train showing a railway idler car of this invention positioned between a conventional flat car carrying a very long structural steel girder and a gondola car.

The preferred embodiment of the railway car of this invention is shown in FIG. 1. The car is structurally designed to carry only its own weight and the weight of required standard railway car components, such as brakes, ladders, couplers and the like. Since it is designed to carry no revenue producing payload or freight, the trucks and springs are also light duty.

Referring especially to FIGS. 2, 3, 4 and 5, the preferred embodiment of this invention comprises a car 1, having a longitudinal box girder center sill 2, a plurality of spaced horizontal crossties 3, extending outwardly from both sides of the center sill 2 and a pair of parallel longitudinal side sills 4. The last pair of crossties 3 at each end of the car 1, comprise the transverse end sills 5.

The space between the side sills 4 and between the crossties 3 is completely open and is not covered with structural flooring. The crossties 3 provide substantially all the structural support for the car between the center sill 2 and side sills 4 which in conventional cars, is provided to a large extent by the floor structure of the car. Short end panels 6 are secured to the top of the side sills 4, end sills 5 and center sill 2 to provide a walkway as required by A.A.R. regulations to permit a brakeman to mount the car and operate the hand brake.

The center sill 2 is designed to carry primarily only axial loads that result from the pushing or pulling of the car in a train. Since the car will not be carrying any vertical loads from freight, the center sill 2, crossties 3 and side sills 4 can be constructed of relatively lightweight structural members.

Figure 4:
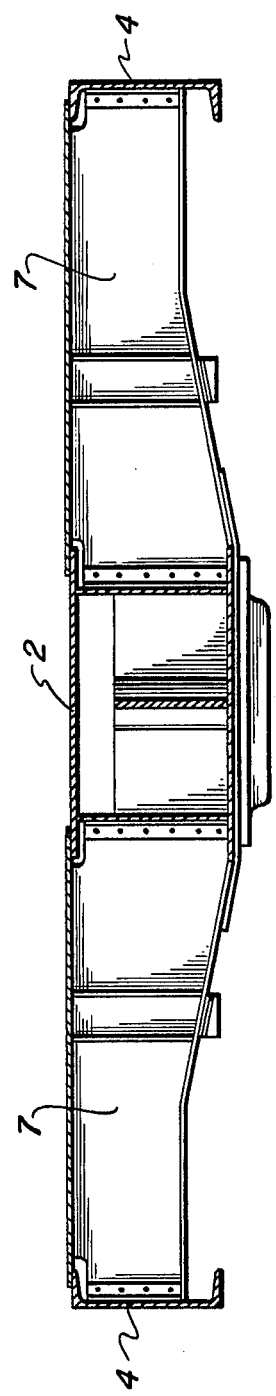
FIG. 4 is a section taken along line 4—4 of FIG. 2.

As best shown in FIGS. 3 and 4, conventional, but lightweight bolster assemblies 7 are positioned at each end of the car 1. Conventional, but light duty trucks (not shown) and springs are secured to each of the bolster assemblies 7. This feature also reduces the overall weight of the car. It is estimated the car of this invention will have a total weight of only about one-third that of a conventional flat car. The car of this invention saves considerable energy when a number of these cars are used in a train.

The car 1 of this invention can also be made shorter than the conventional flat cars. The preferred embodiment of the car of this invention is approximately 36 feet long between strikers.

The car of this invention is used for the sole function as an idler or spacer car. While the car is not designed to carry vertical freight loads, it is designed with sufficient strength to carry all train action loads and has sufficient weight to be stable on curves. The car meets all A.A.R. regulations.

While we have shown our invention by illustrating and describing the preferred embodiment of it, we have done so by way of example and are not to be limited as there are modifications and adaptions that could be made within the teachings of the inventor as claimed.

We claim:

1. A railway idler car for being pushed and/or pulled by a connected and immediately adjacent railway car carrying at least first object extending beyond the car and overlying but not being supported by the idler car, the idler car comprising:

(a) a lightweight center sill for carrying axial loads resulting from pushing and/or pulling of the idler car;

(b) a pair of lightweight side sills, said center sill positioned between said side sills;

(c) a plurality of longitudinally spaced lightweight cross ties interconnecting said center sill with each of said side sills for providing substantial structural support between said center and side sills and for thereby providing an open skeletal frame;

(d) an end panel flooring for defining a walkway secured to said frame at opposite ends thereof and with no other flooring overlying said frame between said walkways so that said frame is substantially floorless and thereby not intended to carry any freight;

(e) a pair of spaced lightweight bolsters, each bolster disposed at an end of said frame; and, (f) a pair of light duty trucks, each truck operably connected to one of said bolsters.

2. The car of claim 1 in which the side sills, center sill and crossties are all structural channels.

3. A train, comprising:

(a) at least a first railway car carrying at least a first object extending beyond at least a first end of said first car; and, (b) a railway idler car operably connected to said first railway car immediately adjacent thereto for being pushed and/or pulled thereby and said idler car underlying but not supporting said object, said idler car comprising:

(i) a lightweight center sill for carrying axial loads resulting from pushing and/or pulling of the idler car by said first car;

(ii) a pair of lightweight side sills, said center sill positioned between said side sills;

(iii) a plurality of longitudinally spaced lightweight cross ties interconnecting said center sill with each of said sills for providing substantial structural support between said center and side sills and for thereby providing an open skeletal frame;

(iv) an end panel flooring for defining a walkway secured to said frame at opposite ends thereof and with no other flooring overlying said frame between said walkways so that said frame is substantially floorless and thereby not intended to carry any freight;

(v) a pair of lightweight bolsters, each bolster disposed at an end of said frame; and, (iv) a pair of light duty trucks, each truck operably connected to one of said bolsters.

* * * * *